United States Patent Office.

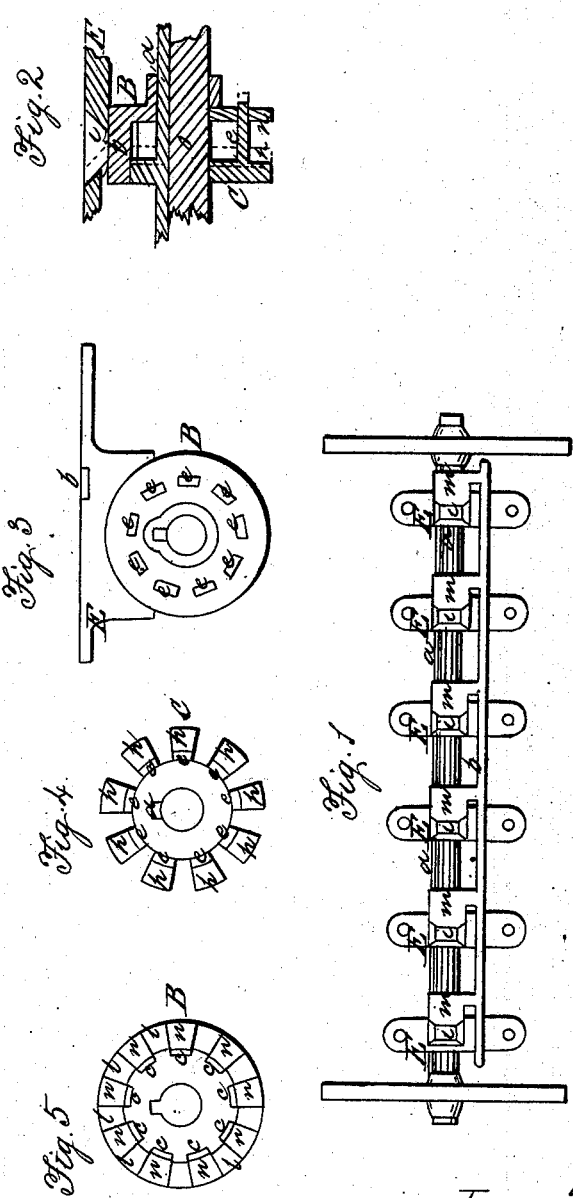

IMPROVEMENT IN SEEDING MACHINE.

H. D. DANN, OF WAUPUN, WISCONSIN.

Letters Patent No. 60,147, dated December 4, 1866.

---

SPECIFICATION.

TO ALL WHOM IT MAY CONCERN:

Be it known that I, H. D. DANN, of Waupun, in the county of Fond du Lac, and State of Wisconsin, have invented certain new and useful Improvements in Seeding Machines; and I do hereby declare that the following is a full, clear, and exact description thereof, reference being had to the accompanying drawings, making part of this specification, and to the letters of reference marked thereon, like letters indicating like parts, wherever they occur.

To enable others skilled in the art to construct and use the invention, I will proceed to describe it.

My invention relates to certain improvements in the construction and arrangement of the seeding cylinders and slides for delivering the grain in such quantities as may be desired.

Figure 1 is a top plan view.

Figure 2, a longitudinal section; and

Figures 3, 4, and 5 are side views of the seed cylinders.

I construct my seeding cylinders in two parts, B and C, both of which are mounted on the axle, O, as shown in fig. 2. The portion B is secured permanently to the axle, while the other portion C is made movable thereon, but is attached permanently to a rod $a$, which lies parallel with the axle, and passes loosely through a hole or recess in the hub of the portion B. The portion B of the cylinder is formed with a continuous disk at one end, from which extends laterally a series of divisions, $l$, as shown in figs. 2 and 5, there being between these divisions a recess $n$, as shown in figs. 5 and 2. At the bottom of these cavities, $n$, a rectangular hole, $c$, is made through the disk, of a width corresponding with the width of the cavities $n$. The other portion of the cylinder, C, consists of a similar disk, having notches cut in its periphery of suitable size to receive the division plates, $l$, of the part B, leaving side plates, $h$, of proper size to fit into the cavities $n$. At the base of these plates, $h$, is a series of laterally projecting pieces, $e$, as shown in figs. 4 and 2, these plates, $e$, being of proper size to fit into the holes, $c$, in the disk B, and form a sliding bottom to the cavity $n$. When the two parts, B and C, are placed together, the plates, $e$, enter the holes $c$, and protrude from the opposite side of B, as shown in fig. 3. It will be seen that by these means a series of seed cells are formed in the periphery of the cylinders, the walls of the cells, $n$, being formed by the disk B on one side, and plate $h$, of disk C, on the opposite side, the divisions $l$ composing the two remaining sides, while the plate $e$ forms the bottom. Now, by pressing the parts B and C together, the size of the seed cells or cavities, $n$, will be reduced, and by drawing them apart the size of the cells will be increased, and thus they may be varied at will. The portion B is secured permanently to the axle O, and the rod $a$ being inserted, all the other portions, C, are attached thereto, so that by moving the rod $a$ all the cells of the entire series of cylinders are either enlarged or decreased in size by a single movement of the rod $a$. Over each of the cylinders is placed a metal plate E, which is secured to the under side of the hopper, (the hopper being omitted in this case,) and which has an opening $i$ formed in it, the sides of this opening being bevelled, as shown in figs. 1 and 2. A sliding cover, $m$, is fitted in the recess in the upper surface of the plate E, this recess being formed of suitable depth to receive the slide $m$, and have its upper surface come flush, or nearly so, with face of plate E. These covers or slides, $m$, are all attached to a bar or rod $b$, as shown in fig. 1, so that by moving this rod $b$ all the slides, $m$, may be closed or opened to any desired extent, simultaneously and with uniformity, and thus to entirely shut off the flow of the grain from the hopper to the cylinders, or to regulate the supply, at will. In arranging the cylinders and the plates, E, care should be taken to place the movable disk, C, of the cylinder on the same side as the slide $m$, so that both will move in the same direction when opened or closed. By this means the opening, $i$, will always be directly over the seed cell, and thus delivering the grain directly to the cell. It is obvious that this form of cylinders and slides may be used with a machine, which delivers the grain in drills, or in one that sows it broadcast, the machine in the first case being provided with drill tubes and in the latter case with a suitable delivering board; but as these devices form no part of my present invention they are not here described.

Having thus described my invention, what I claim, is—

1. The seeding cylinders, consisting of the parts B and C, constructed and arranged to operate in combination, as herein described.

2. I claim attaching the parts B permanently to the axle O, and the parts C to the rod $a$, for the purpose of adjusting the size of cells, as set forth.

3. I claim the plates E, provided with the opening $i$, and the slides $m$, attached to the bar $b$, arranged to operate in combination therewith, as shown and described.

H. D. DANN.

Witnesses:
J. N. ACKERMAN,
DAVID J. DANN.